United States Patent Office 3,046,295
Patented July 24, 1962

3,046,295
PROCESS FOR PRODUCING AMINO-
ALKYLSILANES
Robert J. Lisanke, Buffalo, and Donald L. Bailey, Snyder,
N.Y., assignors to Union Carbide Corporation, a corporation of New York
No Drawing. Filed June 21, 1960, Ser. No. 37,589
8 Claims. (Cl. 260—448.8)

This invention relates to a process for producing aminoalkylsilanes. More particularly, the invention is directed to a process for producing N-(aminoalkyl)aminoalkylsilanes.

The process of this invention comprises contacting under essentially anhydrous conditions a cyanoalkylalkoxysilane with a diamino compound, a hydrogenation catalyst and hydrogen under pressure. For example, beta-cyanoethylmethyldiethoxysilane is contacted with dry ethylene diamine, Raney nickel catalyst, and hydrogen at 1000 pounds per square inch gauge to produce N-(beta-aminoethyl)-gamma - aminopropylmethyldiethoxysilane, $H_2NCH_2CH_2NHCH_2CH_2CH_2Si(CH_3)(OC_2H_5)_2$.

Anhydrous conditions are advantageous in producing N-(aminoalkyl)aminoalkylsilicon compounds by the process of this invention. If water is present in an amount greater than about 2 weight percent (based on the amount of diamino compound) gelation of the reaction mixture takes place and the yield of the desired product is sharply reduced.

The cyanoalkylsilanes useful in the process of the present invention may be represented by the formula:

(A) 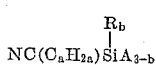

wherein R is a monovalent hydrocarbon group free from aliphatic unsaturation such as alkyl, cycloalkyl, aryl, alkaryl and aralkyl and preferably containing from 1 to 10 carbon atoms, A is an alkoxy group, preferably an alkoxy group containing from 1 to 8 carbon atoms, $a$ is an integer having a value from 2 to 5, $b$ is an integer having a value from zero to 1 and the cyano group is removed from the silicon atom by at least two carbon atoms.

Illustrative of the useful silanes represented by Formula A are the following:

bet-cyanoethyltriethoxysilane,
beta-cyanoethylmethyldiethoxysilane,
gamma-cyanopropylmethyldimethoxysilane,
epsilon-cyano-pentyltriethoxysilane,
gamma-cyano-beta,beta-dimethylpropylmethyldiethoxysilane,
gamma-cyano-isobutylphenylethoxymethoxysilane,
beta-cyanoethylethyldibutoxysilane,
beta-cyanoethylmethyldiheptoxysilane,
beta-cyanoethyl(para-n-butylphenyl)diethoxysilane,
beta-cyanoethyl(gamma-phenylpropyl)diethoxysilane,
beta-cyanopropylnaphthyldiethoxysilane,
gamma-cyano-beta-methylpropyltriethoxysilane,
beta-cyanoethyl(cyclohexyl)diethoxysilane,
beta-cyanoethyltrioctoxysilane and
beta-cyanoethylheptyldiethoxysilane.

A preferred class of cyanoalkylalkoxysilanes are those wherein the $C_aH_{2a}$ group of Formula A has the structure $—CH_2CH_2—$. These beta-cyanoethylalkoxysilanes are preferred because they are easily prepared in high yield by the method described in the next paragraph hereinbelow.

The cyanoalkylalkoxysilanes represented by Formula A may be prepared by reacting a cyano aliphatic compound containing a double bond with a chlorosilane having the formula

wherein R and $b$ have the meanings defined hereinabove with reference to Formula A, in the presence of a conventional platinum catalyst or tri(monovalent hydrocarbon) phosphine catalyst, followed by esterification of the resulting cyanoalkylchlorosilane to give a silane of Formula A. For example, using triphenylphosphine catalyst, acrylonitrile reacts with trichlorosilane to produce beta-cyanoethyltrichlorosilane, and using a platinum catalyst in each instance, methacrylonitrile reacts with phenyldichlorosilane to produce beta-cyanopropylphenyldichlorosilane and allylcyanide reacts with methyldichlorosilane to produce gamma-cyanopropylmethyldichlorosilane. The corresponding alkoxysilanes are obtained by esterification.

The cyanoalkylalkoxysilanes useful in the present invention may also be produced by reacting a chloroalkylalkoxysilane with sodium cyanide in N,N-dimethylformamide (DMF) solvent. For example, sodium cyanide and gamma-chloropropylphenyldiethoxysilane react in DMF to produce gamma-cyanopropylphenyldiethoxysilane, and sodium cyanide and gamma-chloro-beta,beta-dimethylpropyltriethoxysilane react to produce gamma-cyano-beta,beta-dimethylpropyltriethoxysilane.

Chloroalkylchlorosilanes, which can be converted to chloroalkylalkoxysilanes by conventional methods and thereafter reacted with sodium cyanide to give compounds of Formula A, may be produced by the direct chlorination of alkyl chlorosilanes. For example, chlorine reacts with n-propylphenyldichlorosilane in the presence of ultraviolet light to give gamma-chloropropylphenyldichlorosilane and neopentyltrichlorosilane reacts with chlorine in the presence of ultra violet light to give gamma-chloro-beta,beta-dimethylpropyltrichlorosilane.

The diamino compounds useful in the process of this invention may be represented by the formula:

(B) 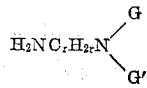

wherein $r$ is an integer having a value from 2 to 6, the nitrogen atoms bonded to the $C_rH_{2r}$ group are separated by at least 2 carbon atoms, G is selected from the class consisting of hydrogen, beta-hydroxyethyl, alkyl groups having from 1 to 6 carbon atoms and $(CH_2CH_2NH)_sH$ groups wherein $s$ is an integer having a value from 1 to 3, and G' is selected from the class consisting of hydrogen, beta-aminoethyl, beta-hydroxyethyl, and alkyl groups having from 1 to 6 carbon atoms.

Illustrative of the diamino compounds represented by Formula B are the following:

$H_2NCH_2CH_2NH_2$,
$H_2NCH_2CH_2CH_2NH_2$,
$H_2NCH_2CH_2C(CH_3)_2CH_2NH_2$,
$H_2NCH(C_2H_5)CH(C_2H_5)NH_2$,
$H_2NCH_2CH_2CH_2CH_2CH_2NH_2$,
$H_2NCH_2CH_2NHCH_2CH_2OH$,
$H_2NCH_2CH_2CH_2N(CH_2CH_2CH_3)_2$,
$H_2NCH_2CH_2N(CH_2CH_3)(CH_2CH_2OH)$,
$H_2NCH_2CH_2CH_2CH_2N(CH_2CH_2CH_2CH_3)$
   $(CH_2CH_2NH_2)$,
$H_2NCH_2CH_2NHCH_2CH_2NHCH_2CH_2NHCH_2CH_2NH_2$,
$H_2NCH_2CH_2N(CH_2CH_2NH_2)$
   $(CH_2CH_2NHCH_2CH_2NH_2)$,
$H_2NCH_2CH_2CH_2CH_2NH(CH_2CH_2CH_2CH_2CH_2CH_3)$,
$H_2NCH_2C(CH_3)_2CH_2N(CH_2CH_2OH)(CH_2CH_2NH_2)$,
and $H_2NCH_2CH_2NH[CH_2CH(CH_3)CH_3]$ Typical examples of the process of the present invention are the following: the reaction of beta-cyano-n-propyltriethoxysilane with ethylene diamine and hydrogen to give N - (beta-aminoethyl)gamma-aminoisobutyltriethoxysilane, the reaction of beta-cyanoethylmethyldiheptoxysilane with N,N-diethylethylene diamine and hydrogen to give N'-(beta-N,N-diethylaminoethyl)-gamma-aminopropylmethyldiheptoxysilane, the reaction of beta-cyanoethylphenyldimethoxysilane with N-hydroxyethylethylene diamine and hydrogen to give N'-(beta-N-hydroxyethylaminoethyl)-gamma-aminopropylphenyldimethoxysilane, the reaction of beta-cyanoethylpropyldiethoxysilane with hexamethylene diamine(1,6) and hydrogen to give N-(omega - amino - n - hexyl)-gamma-aminopropylpropyldiethoxysilane, the reaction of beta-cyanoethyl(cyclohexyl)diethoxysilane with ethylene diamine and hydrogen to give N-(beta-aminoethyl)-gamma-aminopropylcyclohexyldiethoxysilane and the reaction of gamma-cyano-n-butyltriethoxysilane with tetraethylene pentamine and hydrogen to give

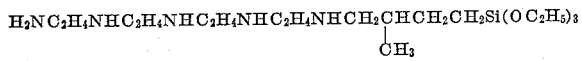

All of these reactions are carried out under anhydrous conditions, in the presence of a hydrogenation catalyst, and with an initial hydrogen pressure at temperature of at least 100 pounds per square inch gauge.

The ratio of reactants in the process of this invention is not critical. However, unless at least one mole of diamino compound per mole of cyanoalkylalkoxysilane is used yields of aminoalkylaminoalkylsilanes of only a few percent are obtained. The preferred mole ratio of diamino compound to cyanoalkylsilane is from about 3-to-1 to about 10-to-1. Mole ratios of 20-to-1 or higher are operable but no particular advantage is gained by employing mole ratios in excess of the 3-to-1 to 10-to-1 range.

The process of this invention may be carried out with or without a solvent and no particular advantage is gained through the use of a solvent. In recovering the product from the final reaction mixture a solvent may be used to wash the product away from the catalyst. If desired the cyanoalkylsilane and the diamino compound may be mixed together in a solvent while being contacted with the catalyst and hydrogen. Any liquid organic solvent conventionally employed in reactions involving organosilicon compounds may be used. Examples of suitable solvents for the starting reaction mixture or for washing out the catalyst are: aliphatic hydrocarbons such as hexane, heptane and petroleum ether, alcohols such as ethanol, butanol and 2-ethylhexanol and aromatic hydrocarbons such as benzene, toluene and xylene.

The reaction temperature and time may vary over wide ranges. In general, temperatures in the range of from 50° C. to 300° C. are employed with times ranging from one hour to 24 hours. At lower temperatures the reaction proceeds slowly and at higher temperatures the yield may be reduced due to decomposition of one or more of the reactants or products. The preferred operating conditions were found to be from 145° C. to 175° C. for 3 to 6 hours.

Any conventional hydrogenation catalyst can be employed. Examples of suitable catalysts are Raney nickel, Girdler nickel (finely-divided nickel on silica gel) and bis(cyclopentadienyl)nickel. The Girdler nickel catalyst has been found to be particularly suitable. The amount of catalyst employed is not critical. About 5 to 10 weight percent of catalyst based on the amount of cyanoalkylsilicon compound represents a convenient amount.

The hydrogen pressure at the operating temperature may vary over wide limits. It has been found that an initial hydrogen pressure at the reaction temperature of at least 100 p.s.i.g. is necessary for yields of more than a few percent. The upper limit of hydrogen pressure is determined by the strength of the equipment used and other considerations of safety. The preferred initial hydrogen pressure at temperature is 1500 p.s.i.g. to 2500 p.s.i.g. As the hydrogenation proceeds, the initial pressure falls steadily as the reaction goes to completion. If the hydrogen pressure drops substantially before the reaction is complete, additional hydrogen may be added.

Because of the high pressure nature of the reaction, the process is suitably carried out in a pressure vessel such as a Paar bomb or an autoclave.

In order to obtain satisfactory yields by the process of this invention it is necessary that the reaction be carried out under anhydrous conditions. The primary potential source of undesirable water is the diamino compound. Consequently the diamino compound should be carefully dried before use. This may be done conveniently by distillation or by employing a suitable drying agent. It has been found that when the amount of water in the system exceeds about 2 weight percent (based on the amount of diamino reactant), gelation of the reaction mixture occurs and the yield of aminoalkylaminoalkyl compound is seriously reduced.

It is also desirable to employ hydrogen gas which is substantially anhydrous. Relatively small amounts of water in hydrogen may interfere with the reaction since the concentration of hydrogen is relatively high at the pressures employed.

The compounds produced by the process of the present invention are useful as sizing agents for glass cloth which is used in the preparation of glass cloth laminates. The glass cloth prior to laminating may be immersed in an aqueous or other solvent solution of the aminoalkylaminoalkylsilicon compounds of this invention. The glass cloth is then removed from the treating solution, dried and dipped into a bath containing a thermosetting resin. Laminates are then prepared according to conventional procedures using the resin coated glass cloth and are cured at elevated temperatures. Suitable thermosetting resins are aldehyde condensation resins, epoxy resins and urethane resins.

In the detailed illustrative examples presented hereinbelow, the following abbreviations are used:

g. ------ gram.
ml. ----- milliliter.
$n_D^{25}$ ---- refractive index at 25° C. of light having the wave length of the sodium "D" line.
p.s.i.g. -- pounds per square inch gauge.

*Example 1*

A mixture of beta-cyanoethyltriethoxysilane (109 g., 113 ml., 0.5 mole), dry ethylene diamine (90 g., 100 ml., 1.5 mole) and 10 grams of Girdler nickel catalyst was charged to a 300 ml. autoclave. The system was pressurized to 1850 p.s.i.g. with hydrogen. The vessel was heated to 150° C. with rocking and the pressure dropped from 2200 p.s.i.g. to 350 p.s.i.g. in one hour. The vessel was thereafter recharged four times with hydrogen to a pressure at temperature of about 1850 p.s.i.g. over a 3.5 hour period and, during the 3.5 hour period, a total of 1150 p.s.i.g. hydrogen pressure drop was observed. At this point, the vessel was cooled to room temperature. The autoclave was vented in a hood and the reaction mixture filtered under a nitrogen atmosphere. Xylene (100 ml.) was used to wash out the autoclave and the washings were filtered and combined with the first filtrate. The combined filtrate was fractionally distilled under reduced pressure through an 18 inch insulated Vigreaux column. By this distillation N(beta-aminoethyl)gamma-aminopropyltriethoxysilane, [11 g., $n_D^{25}$ 1.4365, boiled at 115–124° C. (0.1–1.1 mm. Hg)] was obtained in 10 mole-percent yield.

*Example 2*

Following the procedure of Example 1, dry ethylene diamine and beta-cyano-n-propylmethyldiethoxysilane in a mole ratio of 3-to-1 are mixed in a pressure vessel. Girdler nickel catalyst (10 weight percent based on the silane) is added and the system is pressurized with enough hydrogen to give a pressure of about 2000 p.s.i.g. at 150° C. The vessel is then heated to about 150° C. and rocked at this temperature for four hours. Additional hydrogen is added as needed as the reaction progresses. The vessel is cooled to room temperature, opened and the contents filtered in an inert atmosphere. N-(beta-aminoethyl) - gamma - aminoisobutylmethyldiethoxysilane is then recovered from the filtered reaction mixture by fractional distillation under reduced pressure.

*Example 3*

A mixture of beta-cyanoethyltriethoxysilane (0.5 mole), dry ethylene diamine (1.5 mole), 10 grams of Girdler nickel catalyst and 20 grams of sodium zeolite A pellets (drying agent) was charged to a 300 ml. autoclave. The system was pressurized with hydrogen and heated to 130° C. to 150° C. over a period of six hours at a maximum hydrogen pressure of 1950 p.s.i.g. Five separate additions of hydrogen were made during the 6 hour period, and the total pressure drop was about 4800 p.s.i.g. The autoclave was vented and the reaction mixture was filtered under a nitrogen atmosphere. Xylene (60 ml.) was used to wash out the autoclave and the washings were filtered and combined with the first filtrate. The combined filtrate was fractionally distilled under reduced pressure through an 18 inch insulated Vigreaux column, and N-(beta-aminoethyl)-gamma-aminopropyltriethoxysilane was recovered in 15 mole percent yield.

*Example 4*

A mixture of beta-cyanoethyltriethoxysilane (0.5 mole), ethylene diamine (about 1.5 mole) containing more than about 2 weight percent water, and 5.5 grams of Girdler nickel catalyst was charged to a 300 ml. autoclave. The autoclave was pressurized with hydrogen and heated according to the procedure described in Example 3. The principal product (77 grams) was a yellow-resinous mass. No distillable aminoalkylalkoxysilane was recovered.

What is claimed is:

1. A process for producing N-(aminoalkyl)aminoalkylsilanes which comprises contacting under essentially anhydrous conditions and at a temperature between about 50° C. and 300° C. (1) a cyanoalkyl silane represented by the formula:

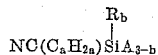

$$NC(C_aH_{2a})_bSiA_{3-b}$$

wherein R is a monovalent hydrocarbon group free from aliphatic unsaturation containing from 1 to 10 carbon atoms, A is an alkoxy group containing from 1 to 8 carbon atoms, a is an integer having a value from 2 to 5, b is an integer having a value from zero to 1 and the cyano group is removed from the silicon atom by at least two carbon atoms, (2) a diamino compound represented by the formula:

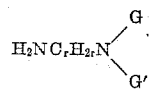

$$H_2NC_rH_{2r}N\begin{matrix}G\\G'\end{matrix}$$

wherein r is an integer having a value from 2 to 6, the nitrogen atoms bonded to the $C_rH_{2r}$ group are separated by at least 2 carbon atoms, G is selected from the class consisting of hydrogen, beta-hydroxyethyl, alkyl groups having from 1 to 6 carbon atoms and $(CH_2CH_2NH)_sH$ groups wherein s is an integer having a value from 1 to 3, and G' is selected from the class consisting of hydrogen, beta-aminoethyl, beta-hydroxyethyl, and alkyl groups having from 1 to 6 carbon atoms, (3) a hydrogenation catalyst, and (4) hydrogen at an initial pressure at temperature of at least 100 pounds per square inch gauge.

2. Process in accordance with claim 1 wherein said cyanoalkylsilane and said diamino compound are mixed together in a liquid organic solvent.

3. A process for producing N-(aminoalkyl)-beta-aminoethylsilanes which comprises contacting under essentially anhydrous conditions and at a temperature between about 50° C. and 300° C. (1) a cyanoalkylsilane represented by the formula:

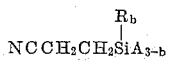

$$NCCH_2CH_2SiA_{3-b}$$

wherein R is a monovalent hydrocarbon group free from aliphatic unsaturation containing from 1 to 10 carbon atoms, A is an alkoxy group containing from 1 to 8 carbon atoms and b is an integer having a value from zero to 1, (2) a diamino compound represented by the formula:

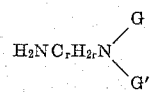

$$H_2NC_rH_{2r}N\begin{matrix}G\\G'\end{matrix}$$

wherein r is an integer having a value from 2 to 6, the nitrogen atoms bonded to the $C_rH_{2r}$ group are separated by at least 2 carbon atoms, G is selected from the class consisting of hydrogen, beta-hydroxyethyl, alkyl groups having from 1 to 6 carbon atoms and $(CH_2CH_2NH)_sH$ groups wherein s is an integer having a value from 1 to 3, and G' is selected from the class consisting of hydrogen, beta-aminoethyl, beta-hydroxyethyl, and alkyl groups having from 1 to 6 carbon atoms, (3) a hydrogenation catalyst, and (4) hydrogen at an initial pressure at temperature of at least 100 pounds per square inch gauge.

4. Process in accordance with claim 3 wherein said cyanoalkylsilane and said diamino compound are mixed together in a liquid organic solvent.

5. Process in accordance with claim 3 wherein said temperature is from about 145° C. to 175° C. and said hydrogen is at a pressure at temperature of between about 1500 and 2500 pounds per square inch gauge.

6. Process in accordance with claim 3 wherein said hydrogenation catalyst is finely divided nickel on silica gel.

7. A process for producing N-(beta-aminoethyl)-gamma-aminopropyltriethoxysilane which comprises contacting under essentially anhydrous conditions and at a temperature of about 150° C. beta-cyanoethyltriethoxysilane, ethylene diamine, finely divided nickel on silica gel and hydrogen at an initial pressure at temperature of about 2200 pounds per square inch gauge.

8. A process for producing N-(beta-aminoethyl)-gamma-aminoisobutylmethyldiethoxysilane which comprises contacting under essentially anhydrous conditions and at a temperature of about 150° C. beta-cyano-n-propylmethyldiethoxysilane, ethylene diamine, finely divided nickel on silica gel and hydrogen at an initial pressure at temperature of about 2000 pounds per square inch gauge.

References Cited in the file of this patent

UNITED STATES PATENTS

| 2,876,209 | De Benneville et al. | Mar. 3, 1959 |
| 2,930,809 | Jex et al. | Mar. 29, 1960 |

FOREIGN PATENTS

| 1,184,198 | France | Feb. 2, 1959 |